Sept. 26, 1933.  T. F. COURTHOPE  1,928,008
SALT DISSOLVING APPARATUS
Filed Dec. 21, 1931
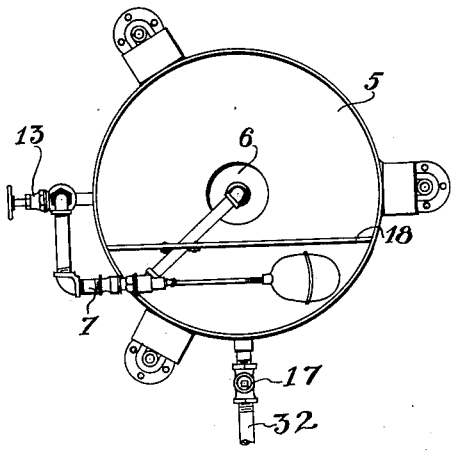
Fig. 2
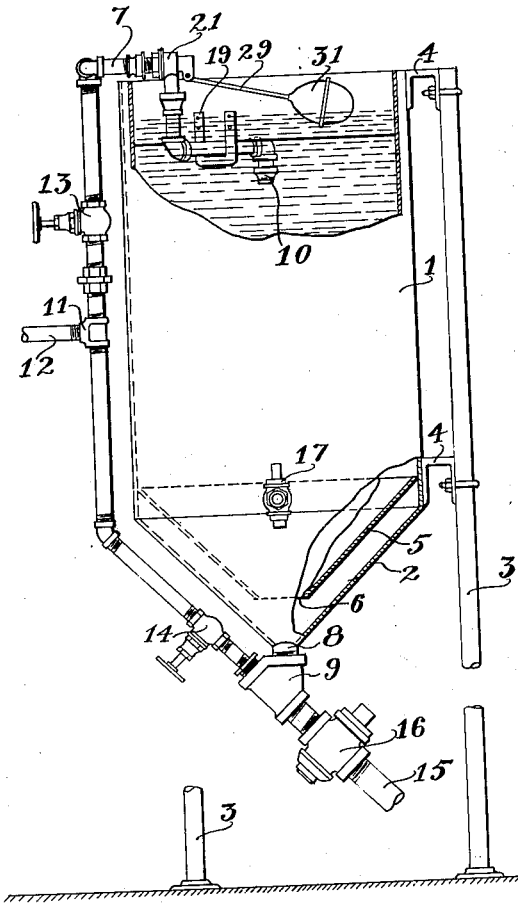
Fig. 1
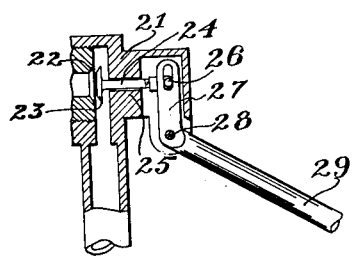
Fig. 4
Fig. 3
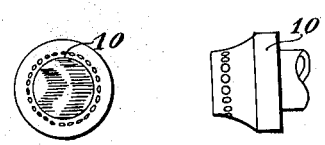
Fig. 5    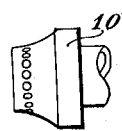 Fig. 6
INVENTOR
Thomas Forster Courthope
ATTORNEY Patented Sept. 26, 1933

1,928,008

UNITED STATES PATENT OFFICE 1,928,008

SALT DISSOLVING APPARATUS

Thomas Forster Courthope, Geneseo, N. Y., assignor to Retsof Mining Company, Retsof, N. Y., a corporation of New York Application December 21, 1931
Serial No. 582,368

3 Claims. (Cl. 23—285)

This invention relates to improvements in salt dissolving apparatus of the kind employed for producing a clear, colorless brine from halite or common rock salt. Rock salt from the mine is seldom pure, but contains shale, calcium, and sometimes iron impurities in varying quantities. Brines made from such salt in the usual manner carry the impurities, some of them, which are very finely divided in suspension, discoloring the solution and rendering it unfit for use where the coloring matter is objectionable and only a clear colorless solution is suitable.

The principal object of this invention is the provision of an apparatus for dissolving salt, which is simple in construction, inexpensive to make, and capable of delivering a practically saturated solution or brine which is clear substantially colorless, and free from objectionable matter.

Another object of the invention is the provision of an apparatus for dissolving salt having automatically operated means for controlling the delivery of the solvent to the salt to be dissolved so that a constantly uniform supply of the solvent is maintained in contact with the salt and a continuous supply of the solution of uniform quality may be produced or delivered.

Still another object of the invention is the provision of an apparatus for dissolving salt comprising a vat in which the dissolving operation takes place, said vat having a bottom wall so constructed as to direct insoluble matter collecting thereon toward an opening positioned centrally therein and connected with means for quickly and forcibly flushing the insoluble matter therefrom.

A still further object of the invention is the provision of a simply constructed apparatus for dissolving salt, which may be continuously operated and in which the solution is filtered and decanted so that a substantially colorless solution, free from coloring matter or solids, may be delivered.

To these and other ends, the invention consists in the construction and arrangement of parts that will appear from the following description when read in conjunction with the accompanying drawing, the novel features being pointed out in the claims at the end of the specification.

In the drawing:

Fig. 1 is a front elevation partly in section and partly broken away of a salt dissolving apparatus constructed according to one possible embodiment of the invention;

Fig. 2 is a plan view of the same;

Fig. 3 is a sectional detail view somewhat enlarged of a float actuated valve;

Fig. 4 is a fragmentary side elevation illustrating the construction of the bottom of the vat;

Fig. 5 is an enlarged detail view of a cap for spraying the solvent into the vat, and Fig. 6 is a side view of the same.

Referring specifically to the drawing, in which like reference numerals refer to the same part in all views, 1 is a vat shown as of upright cylindrical form having an opening at its top and a downwardly and inwardly inclined bottom 2 of substantially inverted cone-shape and having a centrally arranged outlet opening. The vat 1 may be constructed of suitable sheet material and supported in an upright position on legs 3 by means of suitable brackets 4. A second bottom 5 is arranged above the bottom 2 and is inclined downwardly and inwardly toward the central opening 6. The bottom 5 is arranged preferably at an angle of 45° to the horizontal, as shown, and at not less than 40° to the horizontal, thereby insuring ready dislodgment of the salt cake and solids when the vat is cleaned. The false bottom 5 is spaced inwardly from and above the bottom 2 in substantially parallel relation therewith. Salt or other soluble material in the vat is caught on the bottom 5 and directed inwardly and downwardly toward its opening 6, through which it falls on the botom 2 directly over the opening therein.

Means are provided for introducing a suitable solvent, such as water, into the vat at its top within the body of salt or solubles as the latter is fed in from a suitable hopper. Said means comprises a pipe or conductor 7 projecting inwardly over the side of the vat, then downwardly, inwardly, and downwardly to a point of discharge at or near the center of the vat. At its outer end the pipe 7 extends downwardly to a point adjacent the bottom of the vat and is then inclined inwardly and downwardly to a point adjacent the opening in the bottom 2 of the vat. Fitted in the opening in the bottom 2 of the vat is a nipple 8 on which a Y-coupling 9 is threaded. The conductor 7 is also threadedly connected with the coupling 9. Arranged in the conductor 7 is a T-coupling 11 connected by means of a pipe 12 with suitable source of solvent, such as water, under pressure. The pipe 12 is connected with the conductor 7 at a point between the top and bottom of the vat, and a hand operated shut-off valve 13 may be arranged in the conductor 7 above its connection with the pipe 12. Another hand operated cut-off valve 14 is arranged in the conductor 7 between the pipe 12 and the coupling 9. It will be understood that if the valve 14 be closed and the valve 13 opened, the solvent will flow from the pipe 12 through the conductor 7 to its point of discharge in the top of the vat.

It is desirable to spray the solvent into the vat when cleaning or removing the insoluble residue from the vat, and to this end suitable means for spraying the solution are provided in the form of a cap 10 threaded on the open inner end of the conductor. The cap 10 is shown in detail in Figs. 5 and 6, and has a plurality of annularly arranged orifices through which the solvent is sprayed in an outwardly directed sheet and uniformly distributed toward all sides of the vat. A partition in the form of a plate 18 is arranged in the top of the vat and secured at its ends to the inner walls thereof. A U-shaped pipe hanger 19 may project downwardly from this plate to support the inner end of the pipe 7. The partition 18 divides the upper part of the vat into two chambers, one to receive the salt, and the other to contain the water inflow control mechanism that will later be described.

A discharge pipe 15 having a shut-off valve 16 therein is connected with the coupling 9. If the valves 14 and 16 be closed, the salt or soluble material delivered to the vat flows from the opening 6 in the bottom 5 onto the lowermost central part of the bottom 2 and into the nipple 8, and rises on the bottom 2 to the bottom 5 and around the opening 6 therein and supports the mass of soluble material in the vat, but does not rise to any degree in the space between the bottoms 2 and 5. If the valve 13 be opened, the solvent is admitted at the top of the vat and settles or flows through the soluble material therein and carries a portion thereof with it in solution. The degree of concentration increases gradually as it moves downwardly through the mass of soluble material in the vat. It also flows out through the opening 6 into the coupling 9 and rises on the bottom 2 and into the space between it and the bottom 5, and in the vat 1 until the vat 1 may be filled thereby to a point at or adjacent its top.

Any insoluble material contained in the salt gradually settles toward the bottom of the vat and through the opening 6 onto the center of the bottom 2 and through its opening into the coupling 9, and with the soluble material comes to rest against the shut-off valve 16. The side wall of the vat is provided with an outlet opening arranged between the bottoms 2 and 5 at a point adjacent the bottom of the side wall of the vat and between the upper outer margins of the bottoms 2 and 5. The solution reaches its greatest degree of concentration when it flows through the opening 6 and rises in the vat and between the bottoms 2 and 5, and when it reaches the side wall of the vat between said bottoms it may be drawn off through the opening therein. For convenience in controlling the delivery of the solution, said opening may be provided with a suitable valve or faucet 17. A portion of the salt cake and the insoluble impurities lodge on the upper bottom 5, and there form a filter bed for the solution before it passes through the opening 6. The saturated solution after passing through the opening rises between the bottoms 2 and 5 until it reaches the delivery outlet at the top of such space from which it is decanted through the delivery valve 17, while any impurities and insoluble matter settle downwardly between the bottoms 2 and 5, from which they may be cleaned at convenient intervals through the nipple 8.

If the valve 14 is closed and the valve 16 opened, the contents of the vat will be discharged through the pipe 15, and if the valve 13 also be open to admit fresh water to the vat, the contents may be flushed out. If the valve 13 be closed and the valve 14 opened, the fresh water or liquid under pressure is directed through the coupling 9 to the discharge pipe 15 and operates to flush out any hardened insoluble material collected in the coupling 9 or adhering to its walls.

It will be noted that by the arrangement shown, means are provided for flushing out the bottom of the vat and separate means are provided for flushing out the coupling and discharge pipe, so that the vat, discharge pipe and its coupling may be flushed out at regular intervals and kept free from solid matter collecting therein without dismantling or removing any parts.

It is desirable to operate the dissolving apparatus continuously and with the least possible attention on the part of the attendant. To this end, means are provided for automatically controlling or regulating the upper level of the liquid in the vat or the flow of liquid thereto from the inlet conductor 7. Arranged in the conductor 7 just inside the wall of the vat is a float-controlled valve 21, shown in detail in Fig. 3, for controlling the flow of the solvent from the conductor 7 to the vat. Said valve comprises a seat 22 with which a valve member 23 cooperates. When the valve member 23 is seated on the seat, the flow of solvent from the conductor may be completely shut off. When, however, the valve is moved from its seat, the liquid may flow more or less freely through the conductor. The valve member 23 is secured to or formed integral with a stem 24 slidably mounted in the wall 25. For convenience in assembling, the valve stem is preferably made of two parts, as shown, and has a projection or lug 26 in its end whereby it is operatively engaged with the slotted arm of a bell crank lever 27 pivoted at 28 and having an inwardly extending arm 29 having a float 31 of usual or preferred construction secured to its end. The float is normally operative to open the valve; when, however, the liquid rises in the vat it raises the float to move the valve member 23 gradually toward its seat, and before the level of the liquid in the vat reaches its top, the valve member 23 is firmly seated on its valve seat and completely shuts off the flow of the liquid solvent to the vat to prevent overflow. Owing to the partition 18 separating the float chamber from the salt receiving chamber, water can rise in the float chamber and the float can be operated without interference from the inflowing salt to maintain the vat constantly filled with water up to a level determined by the float control. It will be noted that the liquid in the vat is in contact with the soluble material in the vat, which in the case of salt is immedately taken up by water and diffused throughout its mass, increasing its density and therefore its buoyant action on the float.

Briefly described, the operation is as follows. Soluble material, such as salt, may be charged into the vat either at frequent intervals or preferably by means of a hopper in a continuous stream in a manner well known in the art, and the valve 13 is opened to permit the solvent, such as water, to flow through the conductor 7 to the vat. The liquid is delivered to the vat at a point at or adjacent its top and centrally thereof. If the cap 10 be in place, it is sprayed radially therefrom and uniformly distributed in all directions. Assuming that the valves 14 and 16 are closed, the solution rises in the vat and in the space or chamber between the bottoms 2 and 5 until its level reaches the float 31 which is gradually lifted to close its valve and gradually shut off the flow of liquid to the vat. When its level finally reaches its upper limit and before the vat overflows, the float operates to completely close the valve. The valve 17 is adjusted to regulate the flow of the brine from the chamber or space between the bottoms 2 and 5 according to the size of the dissolver so as to enable the solvent to be fully saturated before it emerges from the outlet, when it may be used immediately or carried through a conductor 32 connecting with a suitable storage receptacle. By properly adjusting the valves 13 and 17 and delivering a given quantity of salt or soluble material to the vat in a given interval of time, the apparatus may be operated continuously to deliver a brine or solution of substantially constant density or degree of concentration with little or no attention on the part of the attendant. At frequent intervals, depending on the amount of impurity contained in the salt, it is necessary to flush out the insoluble matter collected in the bottom of the vat. The valve 16 may be opened to permit the contents of the vat to flow out through the discharge pipe 15, and if the impurity is of a kind to move freely, this may be all that is necessary. The angle of inclination of the bottom 5 is such that when water is admitted at the top of the vat for cleaning, the solids are loosened and readily pass downwardly through the opening 6 and out through the pipe 15. In order to assist in thinning the solution and carrying it off to a sewer, the valve 14 may be opened and water admitted at that point into the pipe 15. In some cases, the impurities may have a tendency to cake or bind in the bottom of the vat and its outlet, and are not readily dislodged by the liquid when it escapes freely through the discharge pipe. To remove such refractory matter, the valve 16 may be closed and the valve 14 opened, causing the liquid under pressure to flow through the coupling 9 and upwardly into the bottom of the vat to break up the adhering mass, so that when the valve 16 is again opened, it may be flushed out through the discharge pipe 15.

Although only one embodiment of the invention is shown and described herein, it will be understood that this application is intended to cover such changes or modifications as come within the spirit of the invention or scope of the following claims.

I claim:

1. A salt dissolving apparatus comprising a vat for material to be dissolved, said vat having an open top and a double bottom, the upper bottom being spaced from the lower bottom to afford a liquid chamber therebetween and to support solid material which acts as a filtering medium, the upper bottom having an opening at its lowest point and having an inclination to a horizontal plane of substantially not less than 40° to insure removal of solid material therefrom when cleaning, means for conducting a liquid into the top of the vat, and means for discharging liquid from the upper part of the chamber between the bottoms.

2. A salt dissolving apparatus comprising a vat for material to be dissolved, said vat having an open top and a double bottom, said bottoms being in spaced parallel relationship to afford a chamber therebetween and inclined at angles of not less than 40° to a horizontal plane to insure removal of solid materials when cleaning, the upper bottom having an opening at its lowest point and acting to support solid material to serve as a filtering medium, means for conducting liquid into the top of the vat, and means for discharging liquid from the upper part of the chamber between the bottoms.

3. A salt dissolving apparatus comprising a vat for material to be dissolved, said vat having an open top and a double bottom, said bottoms being in spaced parallel relationship to afford a chamber therebetween and inclined at angles of not less than 40° to a horizontal plane to insure removal of solid materials when cleaning, the upper bottom having an opening at its lowest point and acting to support solid material to serve as a filtering medium, means for conducting liquid into the top of the vat, the lower bottom having an opening at its center for cleaning purposes, a pipe connected therewith for carrying off liquid and solid material when cleaning, means for forcing water into said pipe to assist said action of carrying off materials from the vat, and means for forcing liquid upwardly through said opening to dislodge any solid material on the bottoms.

THOMAS FORSTER COURTHOPE.